US011489414B2

(12) United States Patent
Söhnle et al.

(10) Patent No.: US 11,489,414 B2
(45) Date of Patent: Nov. 1, 2022

(54) DRIVE DEVICE COMPRISING AN ELECTRIC MOTOR AND AN INVERTER AND MOTOR VEHICLE

(71) Applicant: AUDI AG, Ingolstadt (DE)

(72) Inventors: Benjamin Söhnle, Ingolstadt (DE); Sebastian Witt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 361 days.

(21) Appl. No.: 16/835,665

(22) Filed: Mar. 31, 2020

(65) Prior Publication Data

US 2020/0343793 A1   Oct. 29, 2020

(30) Foreign Application Priority Data

Apr. 23, 2019   (DE) .......................... 102019205781.0

(51) Int. Cl.
*H02K 11/33* (2016.01)
*H02M 7/537* (2006.01)
(Continued)

(52) U.S. Cl.
CPC ............. *H02K 11/33* (2016.01); *H02K 5/225* (2013.01); *H02M 7/003* (2013.01); *H02M 7/537* (2013.01)

(58) Field of Classification Search
CPC .......... H02K 11/33; H02K 5/10; H02K 5/225; H01R 2201/10; H01R 2201/26;
(Continued)

(56) References Cited

U.S. PATENT DOCUMENTS

2014/0051286 A1   2/2014   Itsuki et al.
2016/0308299 A1*  10/2016  Mukuno ............ H01R 13/5219
2018/0159187 A1   6/2018   Strasser

FOREIGN PATENT DOCUMENTS

CN    1136230 A    11/1996
CN    103633466 A    3/2014
(Continued)

OTHER PUBLICATIONS

Office Action dated May 8, 2021 in corresponding Chinese Application No. 202010321052.4; 7 pages including English-language translation.
(Continued)

*Primary Examiner* — Bryan R Perez
(74) *Attorney, Agent, or Firm* — Maier & Maier, PLLC

(57) ABSTRACT

A drive device, in particular for a motor vehicle, including an electric motor and an inverter, wherein the electric motor includes at least one electrically conductive motor contact element for electrically contacting a respective electrically conductive inverter contact element of the inverter, wherein the motor contact element is mounted directly or via a motor sealing means on a motor housing component of a motor housing of the electric motor and the inverter contact element is mounted directly or via an inverter sealing means on an inverter housing component of an inverter housing of the inverter, wherein the motor contact element and the inverter contact element are mechanically fastened to one another by a fastening means, wherein the fastening means and a respective housing-external section of the motor contact element and the inverter contact element are accommodated in a liquid-tight receptacle chamber.

12 Claims, 3 Drawing Sheets

(51) Int. Cl.
*H02K 5/22* (2006.01)
*H02M 7/00* (2006.01)

(58) Field of Classification Search
CPC ............... H01R 13/5202; H01R 13/02; H01R 13/6215; H01R 13/639; H01R 24/00; H02M 7/003; H02M 7/537
See application file for complete search history.

(56) References Cited

FOREIGN PATENT DOCUMENTS

| | | |
|---|---|---|
| CN | 203553472 U | 4/2014 |
| CN | 108128270 A | 6/2018 |
| DE | 102007052017 A1 | 5/2008 |
| DE | 112013001644 T5 | 12/2014 |
| DE | 10 2014 000 519 A1 | 7/2015 |
| DE | 102014213973 A1 | 1/2016 |
| DE | 112015001276 T5 | 1/2017 |
| EP | 0 544 327 A2 | 6/1993 |
| JP | 201562344 A | 4/2015 |
| WO | 2012059831 A1 | 5/2012 |

OTHER PUBLICATIONS

Examination Report dated Feb. 7, 2020 in corresponding German application No. 102019205781.0; 20 pages including Machine-generated English-language translation.

* cited by examiner

DRIVE DEVICE COMPRISING AN ELECTRIC MOTOR AND AN INVERTER AND MOTOR VEHICLE

FIELD

The disclosure relates to a drive device, in particular for a motor vehicle, including an electric motor and an inverter, wherein the electric motor comprises at least one electrically conductive motor contact element for electrically contacting a respective electrically conductive inverter contact element of the inverter. In addition, the disclosure relates to a motor vehicle.

BACKGROUND

Inverters are frequently used for energizing electric machines, in particular high-performance electric machines, which can be used, for example, in a motor vehicle as a drive motor, in order to provide an AC voltage for operating the electric motor. Such an inverter can be supplied in motor vehicles, for example, by a direct-current system of the motor vehicle and/or by a vehicle battery. It is frequently advantageous for this purpose to initially form the inverter and the electric machine as separate components. However, since high powers can be conducted via electrical connections between the inverter and the electric machine, a reliable contact protection and a protection from environmental influences, for example, from penetrating liquids can be achieved for such a connection.

One typical approach for this purpose is to use a sealed chamber, also called a terminal box, via which the separate non-sealed electric machine is connected to the separate non-sealed inverter. In this case, however, a pressure equalization and/or media exchange can take place between inverter and electric machine via the terminal box, whereby, for example, coolant medium, oil, or other contaminants are exchanged via this terminal box. Moreover, as a result a relatively large component, which comprises the electric machine and the inverter, has to be sealed. This can require complex designs and/or strongly restrict permissible tolerances.

The document DE 10 2014 213 973 A1 proposes a connection assembly for the mechanically flexible electrical connection of two high-voltage components in a vehicle, for example, an electric motor and a control unit. The components are connected by a high-voltage cable assembly and a low-voltage cable assembly, which are jointly enclosed by an elastically flexible cladding. The cladding can be coupled hermetically sealed to at least one of the housings of the high voltage components to be able to prevent a penetration of fluids into the interior of the cladding. The housings of the high-voltage components are preferably hermetically sealed. It is problematic in this case that the application of the common cladding and the hermetically sealed attachment to the housings are relatively complex and can be completely automated at most with high expenditure.

SUMMARY

The disclosure is thus based on the object of sealing off an electrical contact region between electric motor and inverter against a penetration of liquids with low technical expenditure.

The object is achieved by a drive device of the type mentioned at the outset, wherein the motor contact element is mounted directly or via a motor sealing means on a motor housing component of a motor housing of the electric motor and the inverter contact element is mounted directly or via an inverter sealing means on inverter housing component of an inverter housing of the inverter, wherein the motor contact element and the inverter contact element are mechanically fastened on one another by a fastening means, wherein the fastening means and a respective housing-external section of the motor contact element and the inverter contact element are accommodated in a liquid-tight receptacle chamber, which is at least sectionally formed by the inverter housing component and the motor housing component.

It is thus proposed that the sealing of the receptacle chamber in relation to liquids be carried out at least partially by components of the housing of the electric motor and the inverter. Since the motor contact element and the inverter contact element are fastened to one another without additional cable connection, a very compact structure can be achieved overall and the receptacle chamber can thus be sealed using simple means in a few work steps.

The inverter can in particular be a pulse inverter. For example, a pulse-controlled three-phase bridge inverter can be used. If a multiphase voltage is provided for the electric motor by the inverter, multiple pairs of motor contact elements and inverter contact elements can be used for this purpose, wherein one phase is conducted via each of these pairs. It is possible in this case that a separate receptacle chamber is formed for each pair made of motor contact element and inverter contact element. Alternatively, however, a common receptacle chamber can also be formed, in which all pairs made of motor contact element and inverter contact element are accommodated.

The receptacle chamber is to be liquid-tight in particular in relation to coolant liquids, lubricant liquids, and/or liquids occurring in the surroundings of the receptacle chamber, i.e., in particular with respect to water and oil. Depending on the specific operating situation, it can be sufficient if the receptacle chamber is watertight to sprayed water, for example. However, the receptacle chamber is preferably leak-tight with respect to standing liquids at least for several minutes, for example, 5, 10, 20, or 60 minutes or preferably for multiple hours.

The motor contact element can be enclosed by the motor housing component or the motor housing component and the motor sealing means in such a way that the motor housing is terminated liquid-tight at least in the region of the motor contact element, and/or the inverter contact element can be enclosed by the inverter housing component or the inverter housing component and the inverter sealing means in such a way that the inverter housing is terminated liquid-tight at least in the region of the inverter contact element. A liquid exchange between the receptacle chamber and the interior of the inverter housing and/or the motor housing can be avoided in particular in this way.

The inverter housing and/or the motor housing are preferably terminated liquid-tight. This also means in particular that further terminals and/or shaft feedthroughs of these components are also formed liquid-tight. With respect to the inverter, for example, a terminal for a DC voltage and/or for control signals can also be sealed. In the case of the electric motor, in particular a passage of the shaft is sealed liquid-tight. Moreover, for example, terminals for sensors, a controller, or the like can also be sealed. Liquid-tightness of the entire inverter housing and/or motor housing enables, for example, this housing to be flooded with coolant fluid or the like.

The motor contact element or the inverter contact element can comprise a passage, through which the fastening means extend. In this way, robust contacting of these elements can be achieved using technically simple means.

The fastening means can be a screw which engages in a thread formed by the inverter contact element or the motor contact element. In particular, the one of the contact elements which does not comprise the thread can comprise the passage through which the screw is guided. For example, a screw head can rest directly or via a washer or the like on the edge of the passage and can thus press the contact element comprising the passage against the contact element comprising the thread.

A receptacle chamber sealing means can be arranged between the motor housing component and the inverter housing component to terminate the liquid-tight receptacle chamber liquid-tight on a side of the passage of the motor contact element facing toward the inverter contact element or on a side of the passage of the inverter contact element facing toward the motor contact element. The receptacle chamber sealing means can be preinstalled before the assembly on the motor housing component or the inverter housing component, respectively, or can be inserted between these components in the scope of the assembly. The seal toward the surroundings can preferably be produced jointly on this passage side by the receptacle chamber sealing means and the motor and inverter housing components. The terminus to the electric motor can be produced by the motor housing component, the motor contact element, and optionally the motor sealing means. Toward the inverter, the terminus can be produced by the inverter housing component, the inverter contact element, and optionally the inverter sealing means. The receptacle chamber can thus also be sealed quasi-automatically at least on one side of the passage in the scope of the mechanical fastening of the motor contact element and the inverter contact element on one another. This enables a simple structure of the drive device according to the disclosure, whereby the installation can be automated particularly simply.

The drive can comprise a closure element, which is connected directly or via a closure sealing means to the motor housing component or the inverter housing component in order to terminate the liquid-tight receptacle chamber liquid-tight on a side of the passage of the motor contact element facing away from the inverter contact element or on a side of the passage of the inverter contact element facing away from the motor contact element. The receptacle chamber can thus be terminated liquid-tight in particular in that after the mechanical fastening of the motor contact element and the inverter contact element on one another, the closure element is connected to the motor housing component or the inverter housing component. This can be performed, for example, by screw connections, adhesive bonding, clip connections, or the like. Overall, the liquid-tight receptacle chamber can thus be constructed in a few work steps, which can be automated well. The closure element can in particular be a plate-shaped closure element, which rests directly or via the closure sealing means on a peripheral projection of the motor housing component or the inverter housing component.

The motor housing component or the inverter housing component can form at least one spacer, on which the closure element rests directly or via the closure sealing means and which spaces apart the closure element from the passage. In this way, a receptacle chamber for a part of the fastening means protruding beyond the passage, for example, a screw head or the like, can be provided using simple means.

The motor housing component can be connected via a motor housing seal to a further motor housing component and/or the inverter housing component can be connected via an inverter housing seal to a further inverter housing component. This enables, for example, various materials, shapes, or the like to be used for various housing components. For example, a large part of the housing can be formed from metal, while the component enclosing the motor contact element and/or the inverter contact element is formed from plastic, for example, to ensure an installation of the corresponding contact element.

The receptacle chamber can be at least partially enclosed, i.e., for example, in a specific angle range, by a shielding element, for example, a plate or a conductive grating, to reduce or suppress emission or incidence of electromagnetic radiation in the contact region between motor contact element and inverter contact element.

In addition to the drive device according to the disclosure, the disclosure relates to a motor vehicle which comprises a drive device according to the disclosure.

BRIEF DESCRIPTION OF THE DRAWING

Further advantages and details of the disclosure result from the following exemplary embodiments and the associated drawings. In the schematic figures.

DETAILED DESCRIPTION

Figure 1:
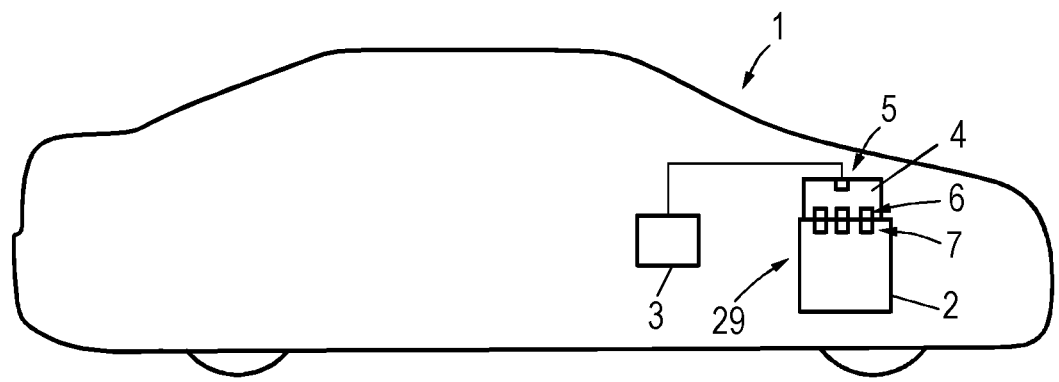
FIG. 1 shows an exemplary embodiment of a motor vehicle according to the disclosure, which comprises an exemplary embodiment of a drive device according to the disclosure, and FIG. 2 show detail view of an exemplary embodiment of the drive device according to the disclosure and/or its components.

FIG. 1 shows a motor vehicle 1, which comprises an electric motor 2, which is to be supplied by a battery 3 and/or a vehicle electrical system. The electric motor 2 can be in particular a drive motor of the motor vehicle 1. The drivetrain of the motor vehicle and the shaft of the electric motor 2 connected thereto are not shown for reasons of clarity.

The electric motor 2 is to be supplied with a three-phase AC voltage, while the battery 3 and/or a vehicle electrical system provides a DC voltage. The electric motor 2 is therefore connected via an inverter 4 to the battery 3 and/or the vehicle electrical system. The electric motor 2 and the inverter 4 jointly form a drive device 29 for the motor vehicle 1. The inverter 4 comprises a DC voltage terminal 5 for connection to the battery 3 and multiple inverter contact elements 6, which are conductively connected to motor contact elements 7 in order to enable energizing of the electric motor 2. The inverter 4 is preferably a pulse inverter, which is controlled by a control unit (not shown) of the motor vehicle 1.

The connection of the inverter contact elements 6 to the motor contact elements 7 is to take place in a liquid-tight receptacle chamber, for example, to avoid a penetration of sprayed water from the surroundings of the motor vehicle 1 and/or of coolant liquid of the electric motor 2 or the like into the contact region. For this purpose, for example, a separate receptacle chamber is used in the motor vehicle 1 for every pair of inverter contact element 6 and motor contact element 7. The procedure described in detail hereafter for providing such a receptacle chamber can also be used, however, if one common receptacle chamber is to be provided for multiple of these pairs.

Figure 2:
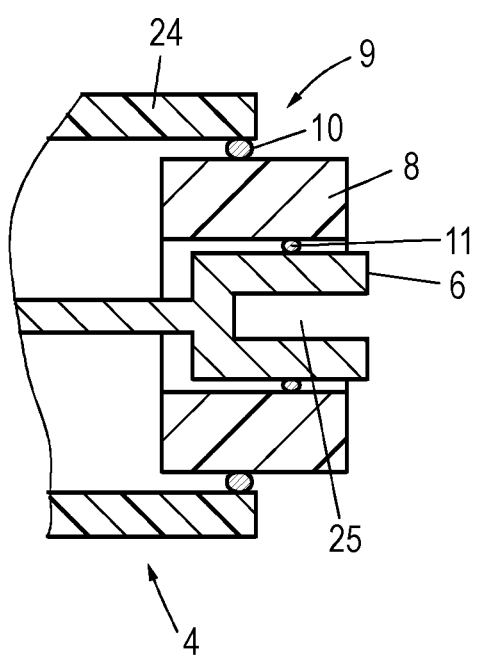

It is explained hereafter on the basis of the example of one of the contacts between inverter contact element 6 and motor contact element 7, with reference to FIGS. 2 to 5, how such contacting and the provision of a liquid-tight receptacle chamber 26 can be implemented using simple technical means and so it can be automated well. FIG. 2 shows a detail view of the inverter 4 in the region of one of the inverter contact elements 6. The inverter contact element 6 is mounted via an inverter sealing means 11 on an inverter housing component 8 of an inverter housing 9 of the inverter 4. The inverter housing component 8 can consist, for example, of plastic or another insulating material, in order to ensure sufficient insulation even if high voltages and/or powers are provided via the inverter contact element 6. In principle, the entire housing 9 could be formed from a single housing component 8. However, it is frequently advantageous to form the housing 9 from multiple housing components 8, 24, wherein preferably an inverter housing seal 10 is used to ensure that the inverter housing 9 is liquid-tight at least in the region of the inverter contact element 6, but preferably over the entire housing.

The inverter contact element 6 can form a thread 25 to enable a robust mechanical fastening and/or a robust electrical contacting of the inverter contact element 6 with the motor contact element 7 in a simple manner, as explained in greater detail hereafter.

Figure 3:
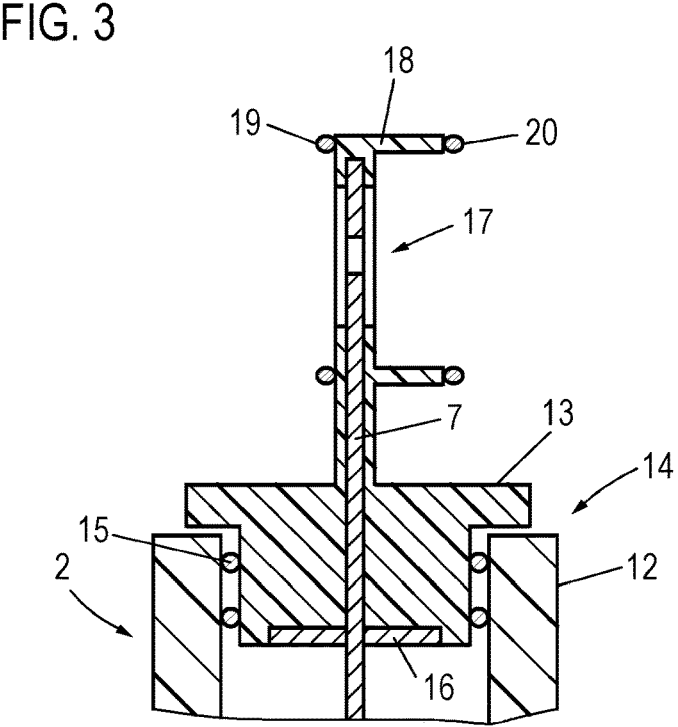
FIG. 3 show detail view of an exemplary embodiment of the drive device according to the disclosure and/or its components.

FIG. 3 shows a detail view of the electric motor 2 in the region of the motor contact element 7. The motor contact element 7 is mounted on a motor housing component 13 of the motor housing 14 of the electric motor 2, wherein the motor sealing means 16 is used for the more robust sealing of the housing in the region of the motor contact element 7. To achieve robust sealing of the motor housing 14 as a whole, the motor housing component 13 is connected via motor seals 15 to at least one further motor housing component 12 of the motor housing 14.

The motor contact element 7 comprises a passage 17, via which, as explained in greater detail hereafter, the contacting takes place with the inverter contact element 6. To be able to provide a liquid-tight receptacle chamber for the contact region in a few simple production steps, spacers 18, receptacle chamber sealing means 19, and closure sealing means 20 are provided on the motor housing component 13. The effect of these components will be explained in greater detail hereafter with reference to FIGS. 4 and 5. The receptacle chamber sealing means 19 and/or closure chamber sealing means 20 can be injection molded on the motor housing component 13, for example. Alternatively, for example, it would also be possible to form these elements as separate components, which are only arranged at the position illustrated in FIG. 3 in the scope of the assembly of various components explained hereafter.

The various sealing means and/or seals can be formed, for example, from rubber or another elastomeric material, a fluid-tight adhesive layer, or the like.

Figure 4:
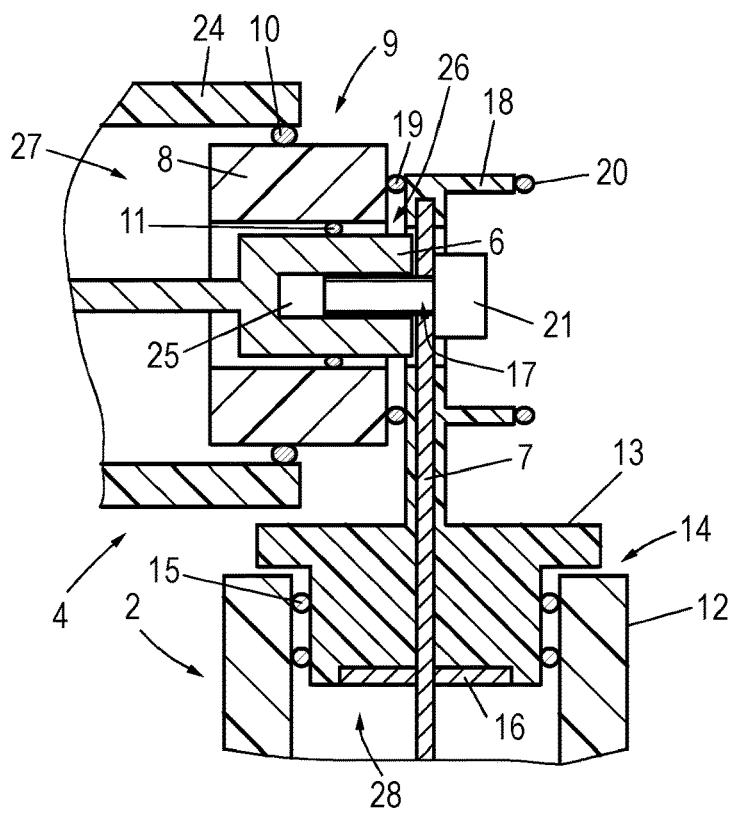
FIG. 4 show detail view of an exemplary embodiment of the drive device according to the disclosure and/or its components.

FIG. 4 shows the connection of the inverter contact element 6 to the motor contact element 7. For this purpose, the inverter housing 9 is arranged with respect to the motor housing 14 in such a way that for each pair of the contact elements to be connected, the passage 17 of the respective motor contact element 7 aligns with the thread 25 of the respective inverter contact element 6. A connection can thus be effectuated easily in that the fastening means 21 is guided through the passage 17 and fastened on the inverter contact element 6.

A screw is used in the example as the fastening means 21, whereby the fastening can be carried out by simply screwing the screw into the thread 25 through the passage 17. In this case, the receptacle chamber sealing means 19 seal the remaining gap between motor housing component 13 and inverter housing component 8 liquid-tight, so that the part of the receptacle chamber 26 accommodating the contact, which is located on the left of the passage 17 in FIG. 4, is automatically sealed liquid-tight. The seal in relation to the surroundings is produced in this case jointly by the motor housing component 13, the inverter housing component 8, and the receptacle chamber sealing means 19. Moreover, the receptacle chamber 26 is sealed off in relation to the inner chamber 27 of the inverter housing 9 by the inverter contact element 6, the inverter sealing means 11, and the inverter housing component 8. A seal in relation to the inner chamber 28 of the motor housing 14 is produced jointly by the motor contact element 7, the motor housing component 13, and the motor sealing means 16.

Figure 5:
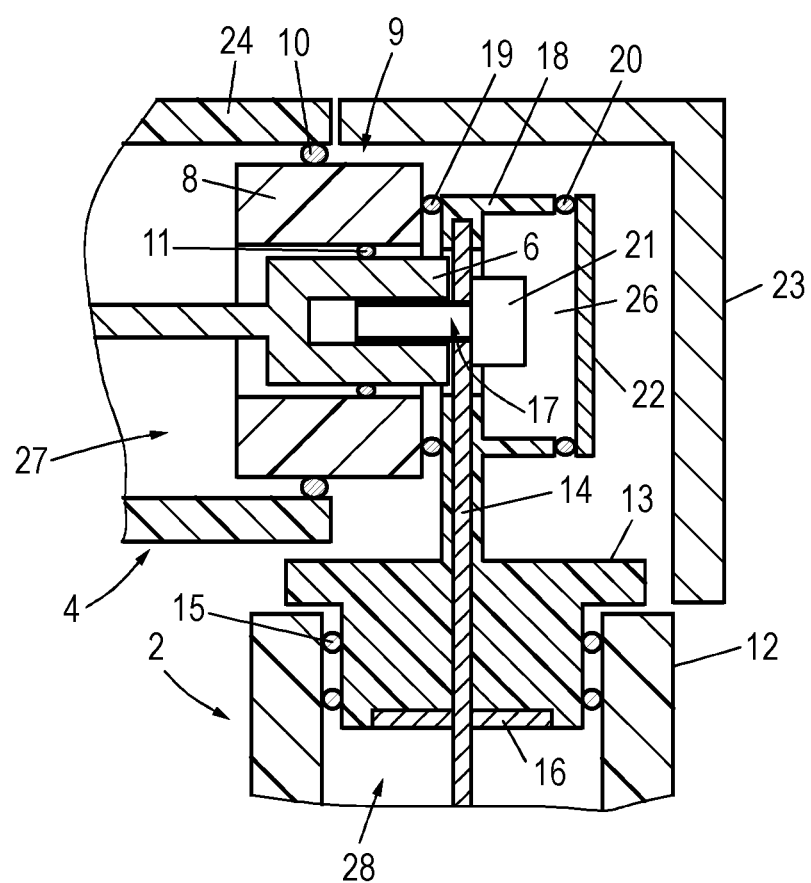
FIG. 5 show detail view of an exemplary embodiment of the drive device according to the disclosure and/or its components.

To also terminate the part of the receptacle chamber 26 located to the right of the passage 17 in FIG. 4 fluid-tight, as shown in FIG. 5, a closure element 22, which is plate-shaped in particular, is placed on the spacer 18 or the closure sealing means 20 arranged thereon and adhesively bonded or screwed or clamped there, for example. The receptacle chamber 26 is thus terminated fluid-tight on all sides.

For electric shielding, the region of the receptacle chamber can be enclosed at least partially by an additional shielding element 23, for example, a conductive grating or a conductive plate. If, for example, the motor housing component 12 and the inverter housing component 24 are also conductive, an electromagnetic shield of the drive device can thus also be implemented with little expenditure.

In one alternative (not shown), the passage 17 could also be a passage of the inverter contact element 6 and the thread 25 could be formed by the motor contact element 7. The further described components can be adapted accordingly.

The invention claimed is:

1. A drive device for a motor vehicle, comprising:
an electric motor and an inverter, wherein the electric motor further comprises at least one electrically conductive motor contact element for electrically contacting a respective electrically conductive inverter contact element of the inverter,
wherein, the motor contact element is mounted directly or via a motor sealing means on a motor housing component of a motor housing of the electric motor and the inverter contact element is mounted directly or via an inverter sealing means on an inverter housing component of an inverter housing of the inverter,
wherein the motor contact element and the inverter contact element are mechanically fastened to one another by a screw which engages a thread formed by the inverter contact element or the motor contact element through a passage in at least one of the inverter contact element and the motor contact element, wherein the screw and a respective housing-external section of the motor contact element and the inverter contact element are accommodated in a liquid-tight receptacle chamber, which is at least sectionally formed by the inverter housing component and the motor housing component.

2. The drive device as claimed in claim 1, wherein, the motor contact element is enclosed by the motor housing component or the motor housing component and the motor sealing means in such a way that the motor housing is terminated liquid-tight at least in the region of the motor contact element, and/or in that the inverter contact element is enclosed by the inverter housing component or the inverter housing component and the inverter sealing means in such a way that the inverter housing is terminated liquid-tight at least in the region of the inverter contact element.

3. The drive device as claimed in claim 2, wherein, the inverter housing and/or the motor housing are terminated liquid-tight.

4. The drive device as claimed in claim 2, wherein, the motor housing component is connected via a motor housing seal to a further motor housing component, and/or in that the inverter housing component is connected via an inverter housing seal to a further inverter housing component.

5. The drive device as claimed in claim 1, wherein, the inverter housing and/or the motor housing are terminated liquid-tight.

6. The drive device as claimed in claim 5, wherein, the motor housing component is connected via a motor housing seal to a further motor housing component, and/or in that the inverter housing component is connected via an inverter housing seal to a further inverter housing component.

7. The drive device as claimed in claim 1, wherein, a receptacle sealing means is arranged between the motor housing component and the inverter housing component, to terminate the liquid-tight receptacle chamber liquid-tight on a side of the passage of the motor contact element facing toward the inverter contact element or on a side of the passage of the inverter contact element facing toward the motor contact element.

8. The drive device as claimed in claim 7, further comprising a closure element, which is connected directly or via a closure sealing means to the motor housing component or the inverter housing component to terminate the liquid-tight receptacle chamber liquid-tight on a side of the passage of the motor contact element facing away from the inverter contact element or on a side of the passage of the inverter contact element facing away from the motor contact element.

9. The drive device as claimed in claim 1, further comprising a closure element, which is connected directly or via a closure sealing means to the motor housing component or the inverter housing component to terminate the liquid-tight receptacle chamber liquid-tight on a side of the passage of the motor contact element facing away from the inverter contact element or on a side of the passage of the inverter contact element facing away from the motor contact element.

10. The drive device as claimed in claim 9, wherein, the motor housing component or the inverter housing component forms at least one spacer, on which the closure element rests directly or via the closure sealing means and which spaces apart the closure element from the passage.

11. The drive device as claimed in claim 1, wherein, the motor housing component is connected via a motor housing seal to a further motor housing component, and/or in that the inverter housing component is connected via an inverter housing seal to a further inverter housing component.

12. A motor vehicle drive device, comprising:
an electric motor and an inverter, wherein the electric motor comprises at least one electrically conductive motor contact element for electrically contacting a respective electrically conductive inverter contact element of the inverter,
wherein, the motor contact element is mounted directly or via a motor sealing means on a motor housing component of a motor housing of the electric motor and the inverter contact element is mounted directly or via an inverter sealing means on an inverter housing component of an inverter housing of the inverter,
wherein the motor contact element and the inverter contact element are mechanically fastened to one another by a screw which engages a thread formed by the inverter contact element or the motor contact element through a passage in at least one of the inverter contact element and the motor contact element, wherein the screw and a respective housing-external section of the motor contact element and the inverter contact element are accommodated in a liquid-tight receptacle chamber, which is at least sectionally formed by the inverter housing component and the motor housing component.

\* \* \* \* \*